United States Patent
Thornburg et al.

(10) Patent No.: US 10,140,783 B2
(45) Date of Patent: Nov. 27, 2018

(54) ENHANCED CENTRAL GATEWAY FOR VEHICLE NETWORKING

(71) Applicant: FORD GLOBAL TECHNOLOGIES, LLC, Dearborn, MI (US)

(72) Inventors: Douglas B. Thornburg, Dearborn, MI (US); Brett Stottlemyer, Southfield, MI (US); Brock Watters, Livonia, MI (US); Nathan Gabrielli, Livonia, MI (US); Richard Englert, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 15/433,401

(22) Filed: Feb. 15, 2017

(65) Prior Publication Data

US 2018/0232959 A1 Aug. 16, 2018

(51) Int. Cl.
| | |
|---|---|
| *H04L 1/00* | (2006.01) |
| *G07C 5/00* | (2006.01) |
| *G07C 5/12* | (2006.01) |
| *H04L 12/40* | (2006.01) |
| *H04L 12/24* | (2006.01) |
| *H04L 29/08* | (2006.01) |

(52) U.S. Cl.
CPC ............ *G07C 5/008* (2013.01); *G07C 5/12* (2013.01); *H04L 12/40* (2013.01); *H04L 41/0686* (2013.01); *H04L 67/12* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | |
|---|---|---|
| 8,086,368 B2 | 12/2011 | Petricoin, Jr. et al. |
| 2012/0105637 A1* | 5/2012 | Yousefi .................. H04N 7/183 348/148 |
| 2012/0106350 A1* | 5/2012 | Yousefi .................. H04N 7/183 370/241 |
| 2014/0226589 A1* | 8/2014 | Yousefi .................. H04N 7/183 370/329 |
| 2016/0044519 A1 | 2/2016 | Bai et al. |
| 2016/0054381 A1 | 2/2016 | Wakan et al. |

(Continued)

*Primary Examiner* — Phirin Sam
(74) *Attorney, Agent, or Firm* — Jennifer M. Stec; Brooks Kushman P.C.

(57) ABSTRACT

A central gateway of a vehicle includes a processor and a storage connected to a plurality of vehicle buses. The gateway receives raw data from an electronic control unit (ECU) via one of the vehicle buses, augments the raw data with availability, classification, and context information, publishes the raw data to a publish/subscribe topic hosted to the storage, and subscribes at least a second ECU of the vehicle to the topic. A database of the central gateway is accessed, according to a determined type of raw data received by a central gateway of a vehicle from an electronic control unit (ECU) via a vehicle bus, for augmenting the raw data with availability, classification, and context information. The augmented data is provided to a publish/subscribe topic hosted by the gateway for accessing over a communication network by a service external to the vehicle.

18 Claims, 7 Drawing Sheets

(56) References Cited

U.S. PATENT DOCUMENTS

| | | | |
|---|---|---|---|
| 2016/0059853 A1* | 3/2016 | Yamakoshi | G05B 15/02 701/36 |
| 2016/0198485 A1* | 7/2016 | Yousefi | H04N 7/183 370/329 |
| 2017/0297570 A1* | 10/2017 | Yamakoshi | G05B 15/02 |

* cited by examiner

ENHANCED CENTRAL GATEWAY FOR VEHICLE NETWORKING

TECHNICAL FIELD

Aspects of the disclosure generally relate to an enhanced central gateway for vehicle networking.

BACKGROUND

Vehicle components send and receive data over vehicle bus protocols such as controller area network (CAN). To communicate, the vehicle components are designed to send handcrafted data exchanges over the CAN bus. CAN message lists are effectively static, so a system operator or implementer is unable to change inputs or outputs without changing software components across multiple controllers. Network bandwidth constraints over the CAN bus prevent modules from publishing excess data, which therefore limits futureproofing of designs. Components performing real-time control tend to be designed with limited headroom for new features or functions. Such systems are often built around a basic task scheduler, not a memory-managed operating system.

SUMMARY

In one or more illustrative embodiments, a system includes a central gateway of a vehicle, including a processor and a storage, connected to a plurality of vehicle buses, programmed to receive raw data from an electronic control unit (ECU) via one of the vehicle buses, augment the raw data with availability, classification, and context information, publish the raw data to a publish/subscribe topic hosted to the storage, and subscribe at least a second ECU of the vehicle to the topic.

In one or more illustrative embodiments, a method includes accessing a database of the central gateway, according to a determined type of raw data received by a central gateway of a vehicle from an electronic control unit (ECU) via a vehicle bus, for augmenting the raw data with availability, classification, and context information; and providing the augmented data to a publish/subscribe topic hosted by the gateway for accessing over a communication network by a service external to the vehicle.

In one or more illustrative embodiments, a non-transitory computer-readable medium comprising instructions that, when executed by a processor of a central gateway of a vehicle connected to one or more vehicle buses, cause the processor to: identify raw data from an electronic control unit connected to one of the vehicle buses responsive to monitoring the one or more vehicle buses for data flows; determining a data type of the raw data; accessing a database of the central gateway to identify availability, classification, and context information with which to augment the raw data; augment the raw data using the availability, classification, and context information to create topic information; and publish the topic information to a publish/subscribe topic hosted by the central gateway.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Modern consumer electronic interfaces are built around rich data flows in which data is sent within containers that provide context and response methods for the contained data. Due to this, consumer electronic devices operate at a higher level of abstraction, and can be developed more quickly and in a more independent and commoditized way. However, vehicle systems tend to use lower-level interfaces, that require coordination between implementers of disparate components, thereby slowing development of in-vehicle networked systems.

In an improved vehicle network, an electrical architecture of the vehicle may be separated into multiple domains, each working with its own level of data and information. A central network gateway (referred to herein as an enhanced central gateway or ECG), connects to all public vehicle networks and transforms raw data traversing the gateway into rich information. By using the ECG, the vehicle components within each domain may be developed and may operate without being constrained by the capabilities of components in other domains of the vehicle.

The ECG may be configured to support existing gateway functionality, support higher-speed in-vehicle networks, provide for enhanced connectivity and enterprise functions, address cyber security, provide for ad-hoc general purpose computing within the vehicle, support an information architecture instead of a data architecture, and provide services in support of a dynamic human-machine interface (HMI). Further details of the operation of the ECG are discussed in detail herein.

Figure 1A:
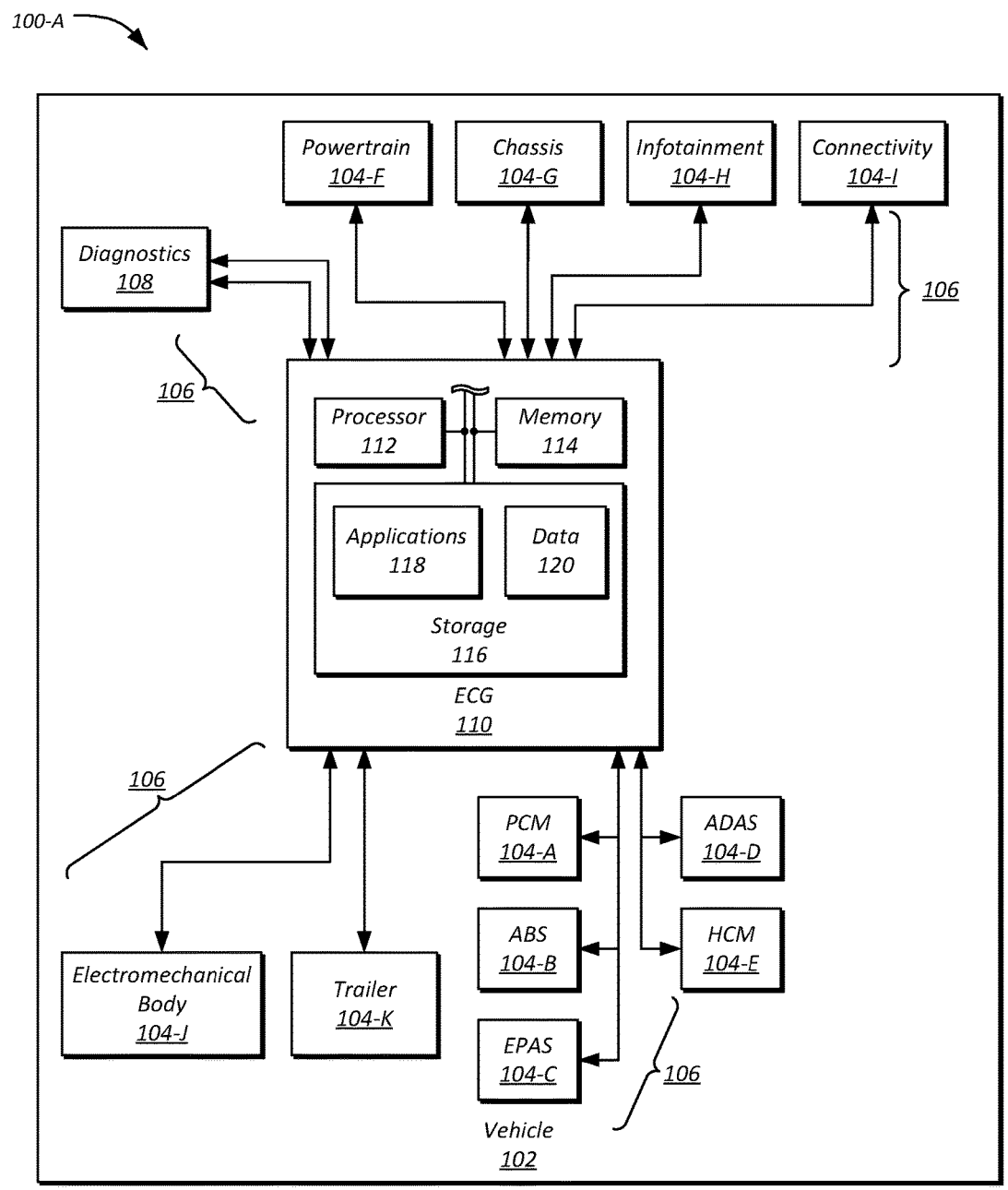
FIG. 1A illustrates an example system including an enhanced central gateway (ECG) information architecture for a vehicle.

FIG. 1A illustrates an example system 100-A including an enhanced central gateway (ECG) 110 information architecture for a vehicle 102. The enhanced central gateway 110 is connected to a plurality of electronic control units (ECUs)

104 over one or more vehicle buses 106. The enhanced central gateway 110 further includes one or more diagnostic ports 108. The enhanced central gateway 110 also includes a processor 112, a memory 114, and a storage 116 for applications 118 and/or data 120. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV).

The vehicle 102 may include a plurality of electronic control units (ECUs) 104 configured to perform and manage various vehicle 102 functions under the power of the vehicle battery and/or drivetrain. As depicted, the example vehicle ECUs 104 are represented as discrete ECUs 104-A through 104-H. However, the vehicle ECUs 104 may share physical hardware, firmware, and/or software, such that the functionality from multiple ECUs 104 may be integrated into a single ECU 104. Or, the functionality of various such ECUs 104 may be distributed across a plurality of ECUs 104. The vehicle ECUs 104 may include various vehicle 102 components configured to receive updates of associated software, firmware, or configuration settings.

As some non-limiting vehicle ECUs 104 examples: a powertrain control module (PCM) 104-A may be configured to control engine and transmission components; an antilock brake system (ABS) 104-B controller configured to control brake and traction control components; an electric power-assisted steering (EPAS) 104-C controller configured to control steering assistance and adjust pull or drift compensation functions; advanced driver assistance systems (ADAS) 104-D such as adaptive cruise control or automate braking; and a headlamp control module (HCM) 104-E configured to control light on/off settings. The ECUs 104 may also include other powertrain 104-F or chassis 104-G components, an infotainment system 104-H configured to support voice command and BLUETOOTH interfaces with the driver and driver carry-on devices (e.g., the SYNC system provided by Ford Motor Company of Dearborn, Mich.), a connectivity controller 104-I such as a telematics control unit (TCU) configured to utilize an embedded modem to access networked devices external to the vehicle 102, electromechanical body controllers 104-J such as window or lock actuators, and trailer controller 104-K components such as light control and sensor data to support connected trailers.

The vehicle bus 106 may include various methods of communication available between the vehicle ECUs 104. The vehicle bus 106 may also support communication between the ECG 110 and the vehicle ECUs 104. As some non-limiting examples, the vehicle bus 106 may be a vehicle controller area network (CAN), an Ethernet network, or a media oriented system transfer (MOST) network. The CAN network or networks may be various types, including, but not limited to, high speed CAN (HS-CAN) having a data capacity of up to 500 kbps, mid-speed CAN (MS-CAN) having a data capacity of up to 125 kbps, and/or CAN flexible data rate (FD-CAN) having a data capacity of up to 2000 kbps or higher. It should be noted that the illustrated bus topology is merely an example, and other numbers and arrangements of vehicle buses 106 may be used.

The vehicle 102 may further include diagnostic ports 108 that may be used by external devices to monitor the status of the vehicle 102. In an example, the diagnostic port 108 may be an on-board diagnostics (OBD) port connected to the vehicle bus 106. A user may connect a dongle, code reader, or other scan device to the diagnostic port 108, and may use the connection provided by the diagnostic port 108 to gain access to messages traversing the vehicle bus 106. Once connected, a user may utilize the connected scan device to capture diagnostic codes, monitor vehicle health, or, in some cases, adjust vehicle settings. Similar to the speed of HS-CAN, the CAN diagnostic ports 108 may support data capacity of up to 500 kbps. In another example, the diagnostic port 108 may be a diagnostic over Internet Protocol (DoIP) port 124, and may provide access to messages traversing the vehicle bus 106 via Ethernet rather than via the OBD standard. A DoIP port 124 may support a higher data rate than CAN, as Ethernet using TCP/IP 64-byte payload can support data rates of approximately 45 Mbps, and with 1460-byte payloads can support data rates of approximately 95 Mbps.

The ECG 110 may be configured to provide an electrical interface between the vehicle buses 106 used to communicate within the vehicle 102. In an example, the ECG 110 may be configured to translate signals and commands between CAN and/or in-vehicle Ethernet vehicle buses 106 connected to the ECG 110. For instance, the ECG 110 may support connection to up to ten CAN vehicle buses 206 and up to seven Ethernet vehicle buses 106. By supporting Ethernet in addition to CAN, the ECG 110 may be able to provide support for higher-speed in-vehicle network communication, while still performing existing or legacy gateway functions within the vehicle 102.

As a specific example, the ECG 110 may be connected to the powertrain 104-F components over a HS-CAN vehicle bus 106; to the chassis components 104-G, safety systems and a cluster over a second HS-CAN vehicle bus 106; to the infotainment system 104-H over a third HS-CAN vehicle bus 106; to the connectivity 104-I and Ethernet security backup systems over a fourth HS-CAN vehicle bus 106; to the electromechanical body controllers 104-J over a first MS-CAN bus; to the trailer controller 104-K and/or nodes readily accessed from the exterior of the vehicle 102 over a second MS-CAN vehicle bus 106; to a diagnostic port 108 over first and second diagnostic data vehicle bus 106 connections; to the PCM 104-A, ABS 104-B, EPAS 104-C, and other controllers over a first FD-CAN vehicle bus 106; and to the ADAS 104-D, HCM 104-E and other controllers over a second FD-CAN vehicle bus 106.

The ECG 110 may be further configured to provide for ad-hoc or other computing functionality in support of the operation of the vehicle 102. For instance, the ECG 110 may include one or more processors 112 configured to perform instructions, commands, and other routines in support of the processes described herein. In an example, the ECG 110 may be configured to execute instructions of applications 118 loaded to a memory 114 of the ECG 110 from a storage medium 116 of the ECG 110. Such applications 118 and other data 120 may be maintained in a non-volatile manner using a variety of types of computer-readable storage medium 116. The computer-readable medium 116 (also referred to as a processor-readable medium or storage)

includes any non-transitory medium (e.g., a tangible medium) that participates in providing instructions or other data that may be read by the processor 112 of the ECG 110. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. As one specific example, the ECG 110 may be provisioned with at least 128 megabytes of RAM, as well as 2-4 cores of processor 112 for processing power to enable various computing tasks.

Figure 1B:
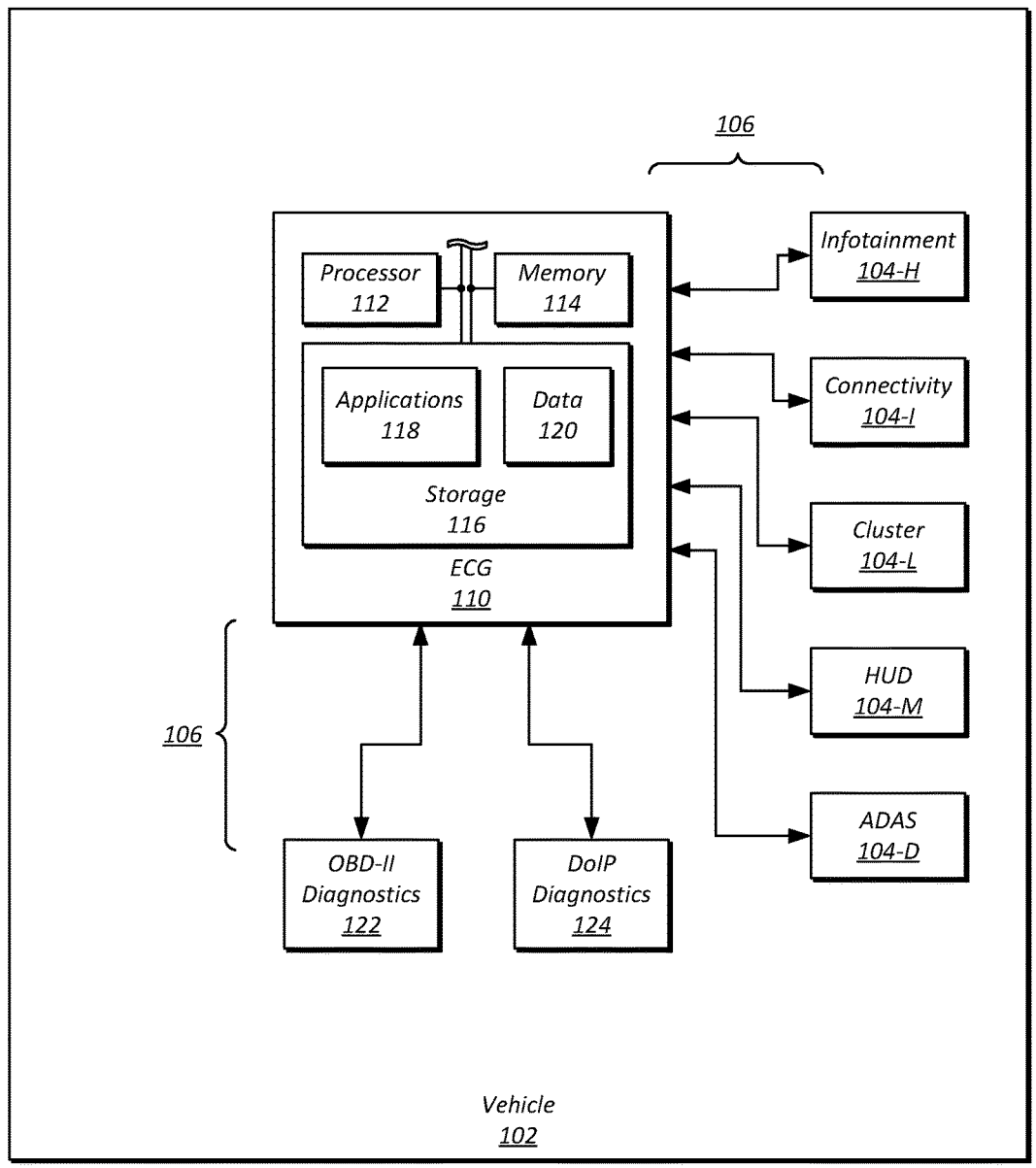
FIG. 1B illustrates an alternate example system including an ECG information architecture for a vehicle.

FIG. 1B illustrates an alternate example system 100-B including an enhanced central gateway (ECG) 110 information architecture for a vehicle 102. As compared to the system 100-A, in the system 100-B the ECUs 104 are connected to the ECG 110 using higher-speed vehicle buses 106. For instance, the infotainment 104-H, connectivity 104-I, cluster 104-L, heads-up display 104-M, and ADAS 104-D are each connected to the ECG 110 via separate 2-wire 100 Mbsp Ethernet vehicle buses 106. (In other examples the heads-up display 104-M may be integrated with the cluster 104-L.) With regard to diagnostics, the ECG 110 may be connected to an ODB-II diagnostics port 122 via a 4-wire 100 Mbsp Ethernet vehicle bus 106 and also to a DoIP diagnostics port 124 (such as an Ethernet jack) via a second 4-wire 100 Mbsp Ethernet vehicle bus 106.

Regardless of architecture, the ECG 110 may utilize its computing functionality to implement distributed computing features and/or enterprise functions that have no natural home within a specific ECU 104 of the vehicle 102 (e.g., MyKey enhanced settings interfaces, extended memory beyond the capabilities of the ECUs 104, power mode management across multiple ECUs 104, etc.). These and other functions may be possible to be implemented at the ECG 110, because the ECG 110 is connected to receive, monitor, and react to network traffic on the vehicle buses 106. Moreover, using CARMON, PARSED, functionality similar to that of a service tool connected to an OBD-II port 122, and/or Diagnostic commands, ECG 110 may also expose information not normally available on the vehicle buses 106 for use in new features.

Accordingly, the distributed features may be built using the ECG 110 according to the information that the ECG 110 is aware of due to its location within the vehicle buses 106 infrastructure of the vehicle 102. Thus, various features may be built into the vehicle 102 using the ECG 110 without forcing changes into the ECUs 104 themselves connected to the vehicle buses 106.

In one example, the ECG 110 may include an application 118 supporting a scripting language to allow on-demand changes in the computation tasks of the ECG 110. As some non-limiting examples, the scripting language used may be Lua, Python, or JavaScript. These scripts may be maintained in the ECG 110 as data 120. Thus, the scripts may be added, modified, and/or deleted from the ECG 110 without requiring a reflash of the firmware of the ECG 110.

Figure 2:
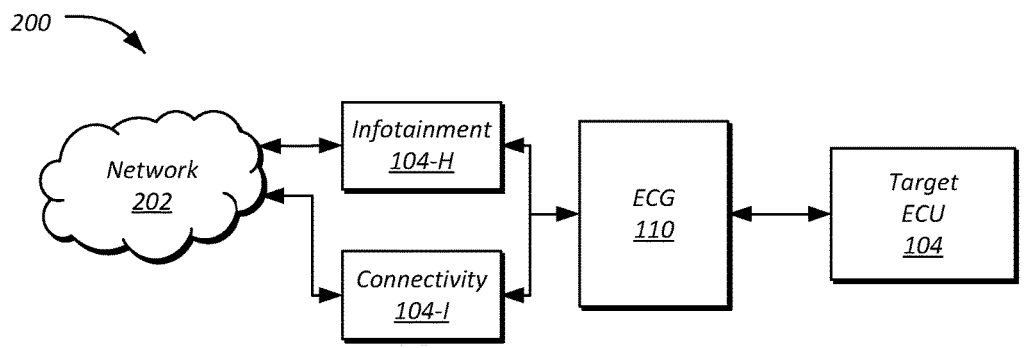
FIG. 2 illustrates an example diagram of connectivity of a target electronic control unit (ECU) to a communications network.

FIG. 2 illustrates an example diagram 200 of connectivity of a target ECU 104 to a communications network 202. As shown, the ECG 110 may be connected to the communications network 202 through various communications channels. These may include through a mobile device paired to and connected to the infotainment 104-H system, and/or via an embedded modem of the connectivity 104-I components. It should be noted that these are merely examples, and other connectivity sources to the vehicle 102 may be available in other examples. For instance, autonomous vehicles may include a further communication channel for autonomous vehicle 102 data and commands.

Figure 3:
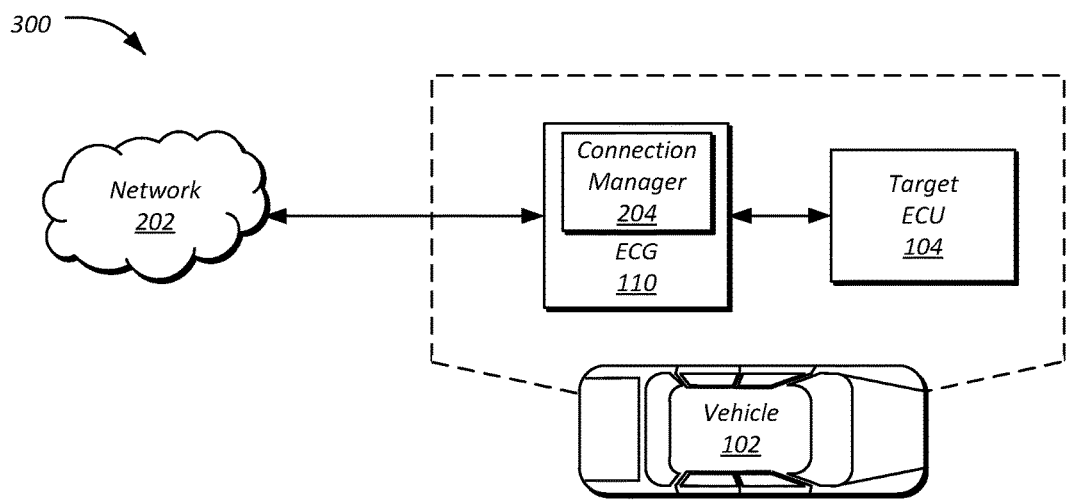
FIG. 3 illustrates an example diagram of connectivity of the target ECU to the communications network utilizing a communication service to abstract away the underlying communication channel used by the target ECU.

FIG. 3 illustrates an example diagram 300 of connectivity of the target ECU 104 to the communications network 202 utilizing a communication manager 204 to abstract away the underlying communication channel used by the target ECU 104. In an example, the communication manager 204 may be an application 118 installed to the storage 116 of the ECG 110. The communication manager 204 may expose a consistent bidirectional interface between the communications network 202 and the vehicle 102, thereby allowing the target ECU 104 to utilize the communication manager 204 for communication services, regardless of the underlying communication channel that is used.

Figure 4:
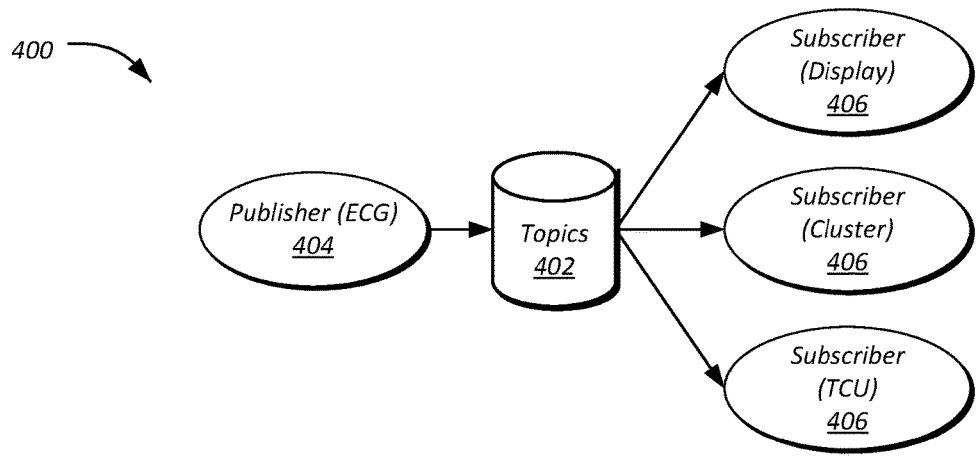
FIG. 4 illustrates an example diagram of a service-oriented architecture for vehicle information.

FIG. 4 illustrates an example diagram 400 of a service-oriented architecture for vehicle information. In an example, the ECG 110 may include a data interface application 118 installed to the storage of the ECG 110. Using the data interface application 118, data may be transformed into information and then made available to users of the data interface application 118. These users may include, for example, other ECUs 104 of the vehicle 102, applications 118 executed by ECG 110, or scripts stored to the ECG 110 that are executed by a scripting engine application 118 of the ECG 110. Using the data interface application 118, the consumers of data may then decide which information they are interested in. The systems that access the information flows may be referred to herein as advanced systems, while the systems that provide the raw data may be referred to herein as basic systems.

The data interface application 118 may support a publish/subscribe data model. The publish/subscribe model may utilize topics 402, also known as logical channels, through which publishers 404 may send messages and subscribers 406 may receive messages. In some examples, a topic tree structure may be utilized by the data interface application 118 to define a structure of the topics and sub-topics that are used in sending and receiving messages.

In the illustrated example, the ECG 110 is a publisher 404 of a topic 402, in this example, of vehicle 102 speed information. There are also three subscribers 406 to the topic 402, which are a display (e.g., heads-up display 104-M), the cluster 104-L, and a TCU used as the connectivity controller 104-I. By using the publish/subscribe model, the subscribers 406 may retrieve the vehicle 102 speed information without having to monitor the vehicle buses 106 for the raw speed data.

Figure 5:
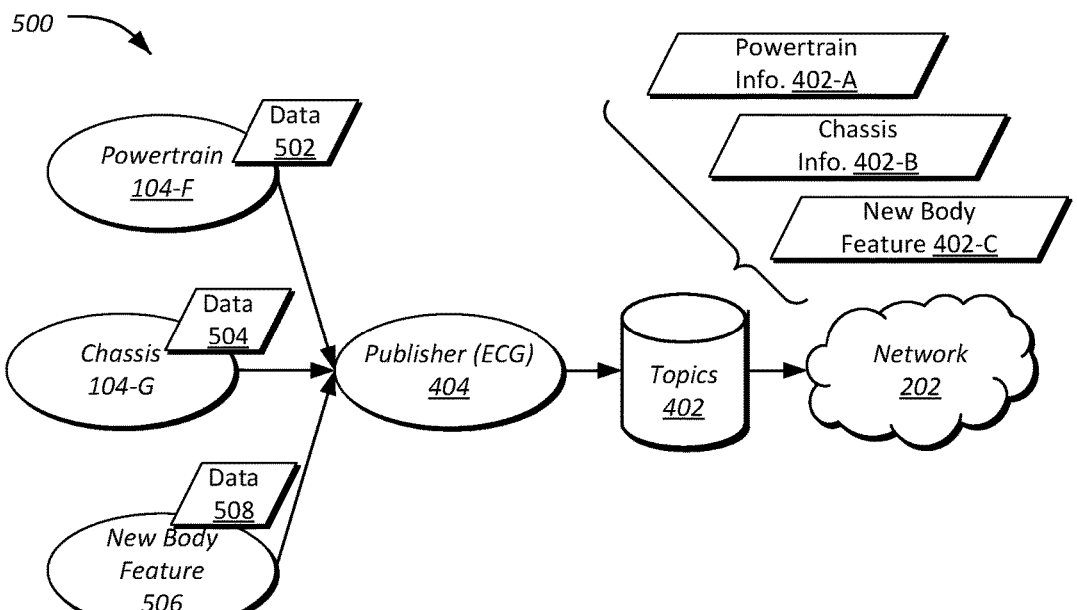
FIG. 5 illustrates an example diagram of a service-oriented networked architecture for vehicle information.

FIG. 5 illustrates an example diagram 500 of a service-oriented networked architecture for vehicle information. As shown, the ECG 110 receives data 502 from powertrain 104-F components, and data 504 from chassis 104-G components via the vehicle buses 106. Acting as publisher 404, the ECG 110 transforms the data 502 into a powertrain information topic 402-A and transforms the data 504 into a chassis information topic 402-B. (Details of an example data transformation are described below with respect to FIGS. 6-7.) Once published, the topics 402-A and 402-B are available to subscribers within the vehicle 102 as discussed above. Moreover, using the communication manager 204, the topics 402-A and 402-B may also be made available from the vehicle 102 to cloud-based services configured to connect to the connectivity services exposed by the vehicle 102.

In some cases, the available elements of data within the vehicle 102 may change. In an example, a new body control feature 506 may be made available within the vehicle 102, such as by way of a software update to a body controller 104-J. In such case, new data 508 may become available to the ECG 110.

The ECG 110 may implement a basic system discoverability feature. The basic system discoverability feature may monitor the vehicle buses 106 for new data 508 flows, such that when a new basic system is added to the vehicle 102 (e.g., the new body control feature 506), the ECG 110 may identify that the new feature is added, and add a new topic 402 to make information available based on the new feature. With the addition of the new topic 402, in this example the new topic 402-C corresponding to the new body control feature 506, the ECG 110 may further transform the new data 508 into information and allow the advanced systems to interact with it.

The ECG 110 may further implement an advanced system discoverability feature. The advanced system discoverability feature may allow advanced services to examine the information topics 402 to determine what information is available. In an example, the data interface application 118 may support a directory including the available topics 402 that may be queried by a connected advanced service. In some examples, the topics 402 may be queried according to categories of information. In an example, the ECG 110 may support querying of the topics 402 to provide a listing of HMI-related information feeds (e.g., vehicle speed, current audio source, oil life, etc.), or a listing of non-HMI-related information feeds (e.g., internal vehicle engine timing characteristics, etc.).

The ECG 110 may also implement a stable system feature. When there are no new basic systems added or removed, and no advanced system queried for topics 402 for a predetermined period of time, the ECG 110 may be configured to abbreviate the topic 402 information flows to improve system performance. This abbreviation may include lowering the sampling rate of the transformation performed by the ECG 110 as publisher 404, as an example. Thus, using the connectivity solutions, the ECG 110 can exchange information back and forth with local and remote services for enhanced functionality.

Figure 6:
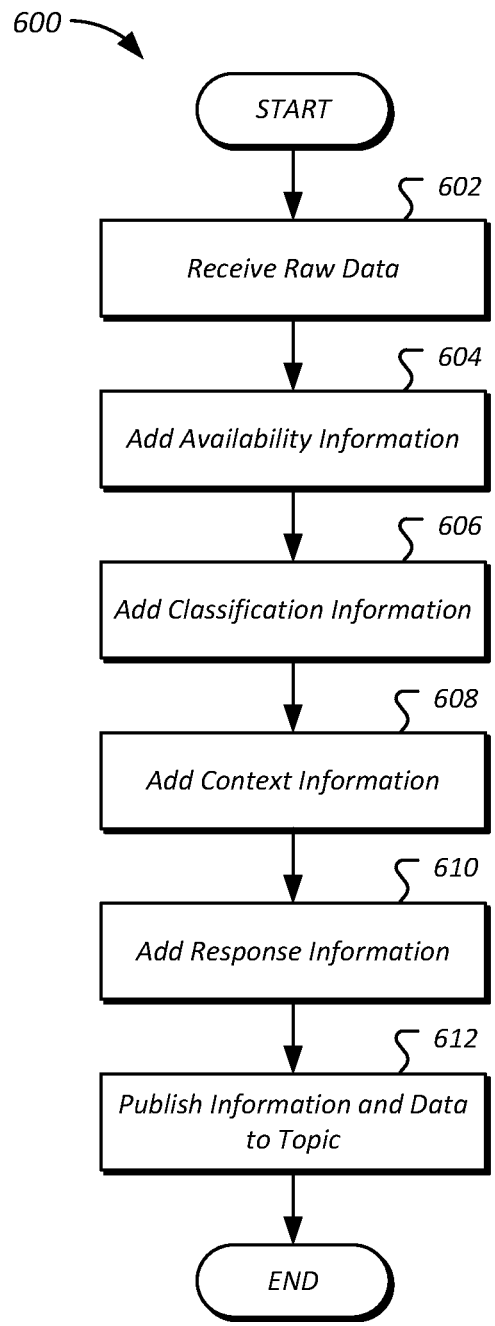
FIG. 6 illustrates an example process for transforming raw data from a vehicle ECU into information to expose via a topic.

FIG. 6 illustrates an example process 600 for transforming raw data from a vehicle ECU 104 into information to expose via a topic 402. In an example, the process 600 may be performed by the ECG 110. The process 600 begins at operation 602, where the ECG 110 receives raw vehicle data. In an example, the ECG 110 extracts CAN data bits from a CAN message traversing a CN vehicle bus 106.

At 604, the ECG 110 adds availability information to the raw data. In an example, the ECG 110 may identify a type of the raw data, and may access a database to retrieve availability information indicative of power modes, fault modes, and latency of the type of raw data. The ECG 110 may also retrieve information related to whether the data is available continuously, periodically, or responsive to a change in the value of the raw data. The ECG 110 adds the availability information to the raw data.

At operation 606, the ECG 110 adds classification information to the raw data. In an example, the ECG 110 may access a database to retrieve the decode method for the type of data (e.g., to allow recipients to unpack the raw data), criteria for identifying errors in the data (e.g., error codes), and data value boundaries of the raw data (e.g., minimum and maximum values). The ECG 110 adds the classification information to the raw data.

The ECG 110 adds context information to the raw data at 608. In an example, the ECG 110 may access a database to retrieve whether the raw data has an HMI implication (e.g., is currently displayed or is potentially data that may be displayed), details of the HMI for the raw data type (e.g., display units and format), membership of the data in a group of data elements (e.g., whether the element is one of a set of related items), and relationship to other data (e.g., if there are other data elements that change as a result of this element changing). The ECG 110 adds the context information to the raw data.

At operation 610, the ECG 110 adds response information to the raw data. In an example, the ECG 110 may access a database to retrieve methods for interaction with the data sender of the type of data. In an example, the response information may include method to call to change a value indicated by the raw data, or methods to call to confirm the raw data by a recipient. The ECG 110 adds the response information to the raw data.

At 612, the ECG 110 publishes the transformed raw data to a topic 402. In an example, the ECG 110 identifies a topic 402 that corresponds to the type of the raw data, and publishes the data in the indicated topic 402. Accordingly, the raw data may be made available as an information flow for use by advanced systems of the vehicle 102 or by remote cloud services in communication with the vehicle 102 over the network 202.

Figure 7:
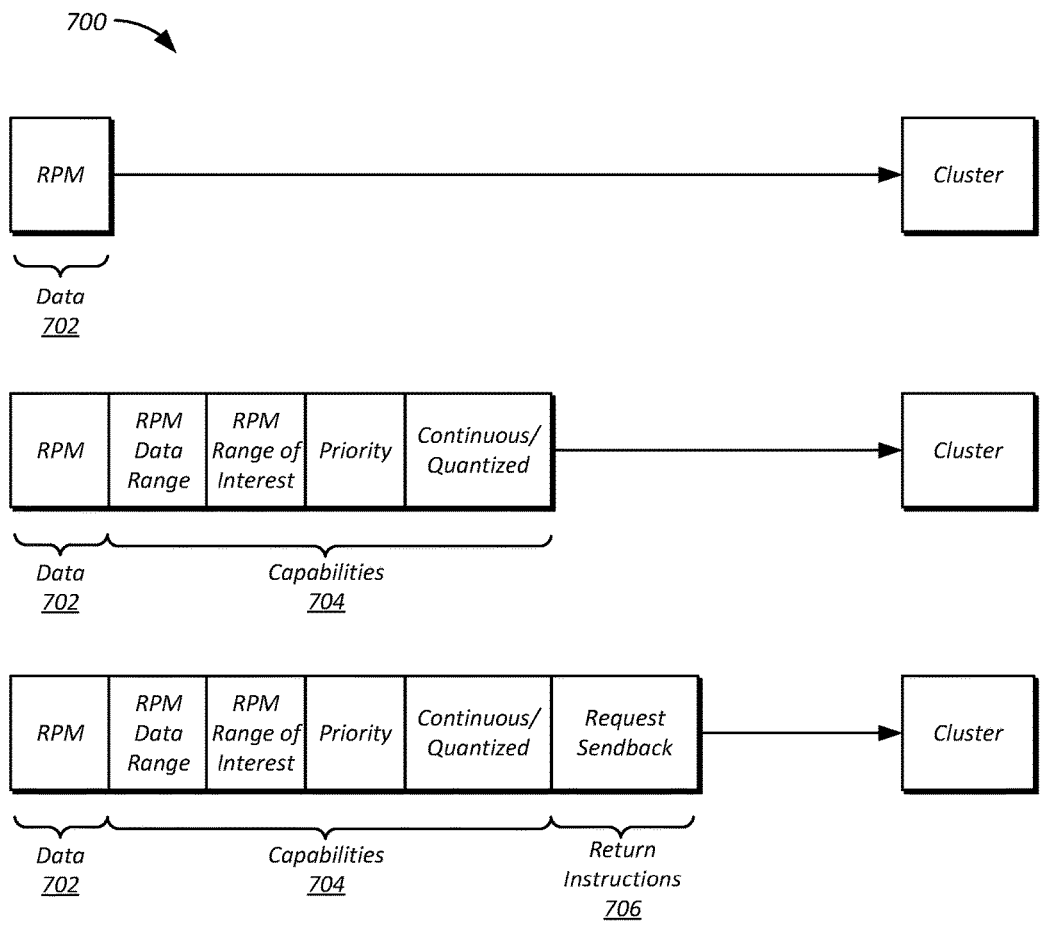
FIG. 7 illustrates an example diagram of an example transformation of raw data into information to expose via a topic.

FIG. 7 illustrates an example diagram 700 of an example transformation of raw data 702 into information to expose via a topic 402. As shown, the raw data 702 exposes revolutions per minute (RPM) of an engine of the vehicle 102 (e.g., that the RPM is currently 2300 RPM). The raw data 702 may be made available over the vehicle bus 106 by the powertrain 104-F in an example. The ECG 110 may monitor the vehicle bus 106 and may receive the raw data 702. Using a process such as the process 600, the ECG 110 may add additional information to the raw data 702. For instance, the ECG 110 may add capabilities 704 to the data, such as availability information indicating that the raw data is available continuously and quantized. The ECG 110 may also add classification information including a data range for the RPM (e.g., 0-8000) and a range of interest for the RPM (e.g., RPM of 6000+ is critical). The ECG 110 may additionally add context information to the raw data, such as that the information is of a low priority when below the critical RPM, but of a higher priority when at or above the critical value. The ECG 110 may additionally add return instructions data (e.g., indications of methods that may be used by a recipient of the data to query for colors or other information for display of the RPM). This augmented raw data may then be published to an RPM topic 402 by the ECG 110 acting as publisher 404. Advanced systems of the vehicle 102, such as the infotainment 104-H, connectivity 104-I, cluster 104-L, and heads-up display 104-M may accordingly subscribe to the RPM topic to receive the raw data 702 as well as the capabilities 704, to allow for display, scripting, logging, or various other uses.

It should be noted that the information flows published to the topics 402 may be two-way in addition to one-way. In an example, the response information may include information indicative of messages that may be published by subscribers to the topic 402 to which the information feed is published (or to other topics 402). These messages published by subscribers may be received by the ECG 110, and used to direct the ECG 110 to send commands back over the vehicle buses 106. Accordingly, the ECG 110 may provide a two-way, real-time transformation layer to allow the advances systems/cloud side to interact with the basic services of the vehicle 102.

For instance, the ECG 110 may receive a data request or software from a cloud server. In response, the ECG 110 may send the software to a target ECU 104 or request the data from a target ECU 104. This request or transfer may be performed over one or more vehicle buses 106 of the vehicle 102 connected to the ECG 110. The ECG 110 may further monitor the vehicle buses 106 for a response, such as confirmation of receipt of the software update by the target ECU 104, or receipt of the requested information from the target ECU 104. The ECG 110 may accordingly translate the received raw data (as discussed herein) and publish (or send in response) the information flow to the cloud requester.

Figure 8:
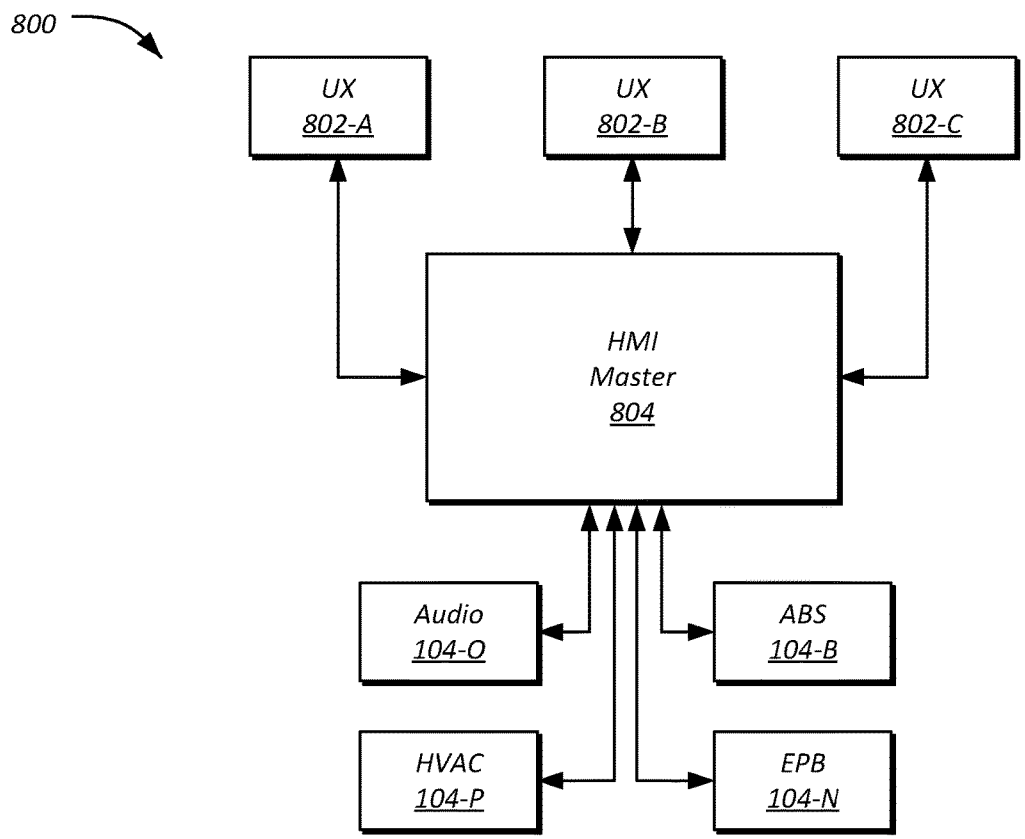
FIG. 8 illustrates an example diagram of an example dynamic human-machine interface (HMI) utilizing the services of the ECG.

FIG. 8 illustrates an example diagram 800 of an example dynamic HMI utilizing the services of the ECG 110. As shown, three user experience (UX) components 802-A, 802-B and 802-C (collectively 802) are included, in communication with an HMI master component 804. The UX components 802 may include various components of the vehicle 102 such as the cluster 104-L, the heads-up display 104-M, or a screen of the infotainment system 104-H. The HMI master component 804 may be implemented by an application 118 executed by the ECG 110. The HMI master component 804 may also be in communication with various ECUs 104 of the vehicle 102 through the services of the ECG 110 connections to the vehicle buses 106. For instance, the EGC 110 may be in communication with one or more basic systems such as an ABS 104-B controller and an EPB 104-N controller. The EGC 110 may also be in communication with one or more advanced systems, such as an audio system 104-O and a heating, ventilation, air conditioning (HVAC) system 104-P.

The UX components 802 may be configured to identify their interfaces and capabilities. In an example, the UX components 802 may subscribe to the HMI master component 804, and may indicate in one or more messages to the HMI master component 804 the capabilities of the UX component 802. For instance, the UX component 802 may indicate to the HMI master component 804 that the UX component 802 requests a list of gauge cluster information, of which five elements may be displayed at a time.

The HMI master component 804 may be configured to utilize the services of the ECG 110 that convert raw (e.g., simple) data from the basic systems into information flows. Using the topics 402, the HMI master component 804 may route structured information flow data to the UX components 802. Notably, this routing may be performed independent of the physical traffic from the basic system components on the vehicle buses 106. Moreover, as the UX components 802 are decoupled from the vehicle bus 106 traffic, as new displayable features are added or removed, the rest of the HMI (e.g., each of the UX components 802) does not require programming updates or other adjustments.

As another example of the flexibility of the ECG 110, a rain sensor of the vehicle 102 may provide a raw data flow for a status of detection of rain, and a door control unit (DCU) may provide a method for controlling vehicle windows. The ECG 110 may transform the raw data flow of the rain sensor into a rain sensor topic 402, and may transform control of the windows via the DCU into a second topic 402. An agent, such as a script stored as data 120 to be executed by a scripting language application 118 of the ECG 110, may then be programmed to utilize the topics 402 to link the event of rain being detected into a command to roll the windows up. Thus, at the platform level, the ECG 110 flattens the CAN signals into information flows. Moreover, while the rain sensor and DCU embed signals within the CAN vehicle bus 106, the rain sensor and DCU are not required to coordinate with one another.

As another possibility, the ECG 110 may provide a single point of control for vehicle 102 network security. As such, the ECG 110 may serve as a firewall and also as a single location to update when new threats emerge. Moreover, the processing power of the ECG 110 may enable the ECG 110 to run network scanning, virus detection, or other services, and may be able to handle threats in an autonomous fashion.

Computing devices described herein, such as the ECUs 104 and ECG 110, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a central gateway of a vehicle, including a processor and a storage, connected to a plurality of vehicle buses, programmed to:
   receive raw data from an electronic control unit (ECU) via one of the vehicle buses,
   augment the raw data with availability, classification, and context information, publish the raw data to a publish/subscribe topic hosted to the storage,
   subscribe at least a second ECU of the vehicle to the topic;
   receive second raw data from a second ECU via one of the vehicle buses;
   augment the second raw data with availability, classification, and context information; and
   publish the second raw data to a second publish/subscribe topic hosted to the storage.

2. The system of claim 1, wherein the central gateway is further programmed to
   augment the raw data with response information indicating an interface for controlling the ECU,
   receive a command from the second ECU to control the ECU,
   send a message via the one of the vehicle buses to the ECU to control the ECU.

3. The system of claim 1, wherein the vehicle buses include controller area network (CAN) buses and Ethernet buses.

4. The system of claim 1, wherein the availability information includes information indicative of power modes, fault modes, and latency of the raw data.

5. The system of claim 1, wherein the classification information includes a decode method for the raw data, criteria for identifying errors in the raw data, and data value boundaries of the raw data.

6. The system of claim 1, wherein the context information indicates whether the raw data has a human-machine interface (HMI) implication defining whether the data is currently displayed or is of a type of data to be displayed.

7. The system of claim 1, wherein the central gateway is further programmed to access a database of the central gateway to identify the availability, classification, and context information according to a determined type of the raw data.

8. A method comprising:
   accessing a database, for each of multiple raw data types received by a central vehicle gateway from an electronic control unit (ECU) via a vehicle bus, for augmenting each raw data type with availability, classification, and context information;
   providing the augmented data for each raw data type to a corresponding publish/subscribe topic hosted by the gateway for remote accessing over a communication network by a service external to the vehicle.

9. The method of claim 8, further comprising connecting the gateway to the service external to the vehicle via a connection manager configured to abstract away which ECU of the vehicle provides an underlying communication channel to the communication network.

10. The method of claim 8, further comprising providing a listing of published topics hosted by the gateway to the service external to the vehicle responsive to a request from the service for the listing.

11. The method of claim 8, further comprising augmenting the raw data with response information indicating an interface for controlling the ECU.

12. The method of claim 11, further comprising sending a message via the vehicle bus to the ECU to control the ECU responsive to receiving a command from the service external to the vehicle to control the ECU.

13. The method of claim 8, wherein the vehicle buses is a controller area network (CAN) bus, and the communication network is a wide-area cellular network.

14. A non-transitory computer-readable medium comprising instructions that, when executed by a processor of a central gateway of a vehicle connected to one or more vehicle buses, cause the processor to:
   identify raw data from an electronic control unit connected to one of the vehicle buses responsive to monitoring the one or more vehicle buses for data flows;
   determining a data type of the raw data;
   accessing a database of the central gateway to identify availability, classification, and context information with which to augment the raw data;
   augment the raw data using the availability, classification, and context information to create topic information;
   publish the topic information to a publish/subscribe topic hosted by the central gateway;
   identify second raw data from a second ECU responsive to monitoring the vehicle bus for data flows;
   augment the second raw data with availability, classification, and context information; and
   publish a second topic including the second raw data as augmented.

15. The medium of claim 14, further comprising instructions to cause the processor to identify the availability information as including information indicative of power modes, fault modes, and latency of the raw data.

16. The medium of claim 14, further comprising instructions to cause the processor to identify the classification information as including a decode method for the raw data, criteria for identifying errors in the raw data, and data value boundaries of the raw data.

17. The medium of claim 14, further comprising instructions to cause the processor to identify the context information as indicating whether the raw data has a human-machine interface (HMI) implication defining whether the data is currently displayed or is of a type of data to be displayed.

18. The medium of claim 14, further comprising instructions to cause the processor to connect the gateway to a service external to the vehicle via a connection manager configured to abstract away which ECU of the vehicle provides an underlying communication channel to a communication network.

\* \* \* \* \*